United States Patent [19]
Inagaki et al.

[11] Patent Number: 5,167,494
[45] Date of Patent: Dec. 1, 1992

[54] SCROLL TYPE COMPRESSOR WITH AXIALLY SUPPORTED MOVABLE SCROLL

[75] Inventors: Mitsuo Inagaki; Hideaki Sasaya; Mikio Matsuda, all of Okazaki, Japan

[73] Assignee: Nippon Soken Inc., Nishio, Japan

[21] Appl. No.: 707,970

[22] Filed: May 23, 1991

Related U.S. Application Data

[62] Division of Ser. No. 472,562, Jan. 31, 1990, abandoned.

[30] Foreign Application Priority Data

Jan. 31, 1989 [JP] Japan .................................. 1-23574
Aug. 31, 1989 [JP] Japan .................................. 1-226263

[51] Int. Cl.⁵ .................... F04B 49/02; F04C 18/04; F04C 29/10
[52] U.S. Cl. .................... 417/440; 418/55.3; 418/55.5
[58] Field of Search ............... 418/55.3, 55.1, 55.5; 417/440

[56] References Cited

U.S. PATENT DOCUMENTS

| | | | |
|---|---|---|---|
| 3,874,827 | 4/1975 | Young | 418/55.5 |
| 3,924,977 | 12/1975 | McCullough | 418/55.5 |
| 4,259,043 | 3/1981 | Hidden et al. | 418/55.3 |
| 4,650,405 | 3/1987 | Iwanami et al. | 418/5 |
| 4,877,382 | 10/1989 | Caillat et al. | 418/55.5 |

FOREIGN PATENT DOCUMENTS

55-46046   3/1980   Japan ..................... 418/55.5

*Primary Examiner*—John J. Vrablik
*Attorney, Agent, or Firm*—Cushman, Darby & Cushman

[57] ABSTRACT

A scroll type compressor having movable and fixed scrolls forming a working chamber with a movable scroll supporting arrangement to prevent tilting of the movable scroll into the fixed scroll thereby making it possible to extend the axial length of the scrolls. A main supporting plate is fixed on a housing between two other supporting plates which are spacedly fixed on the movable scroll, or vice versa. The other supporting plates press on the main supporting plate from both sides via ball bearings. When the movable scroll is about to tilt, the supporting plate arrangement prevents the movable scroll from tilting.

4 Claims, 9 Drawing Sheets

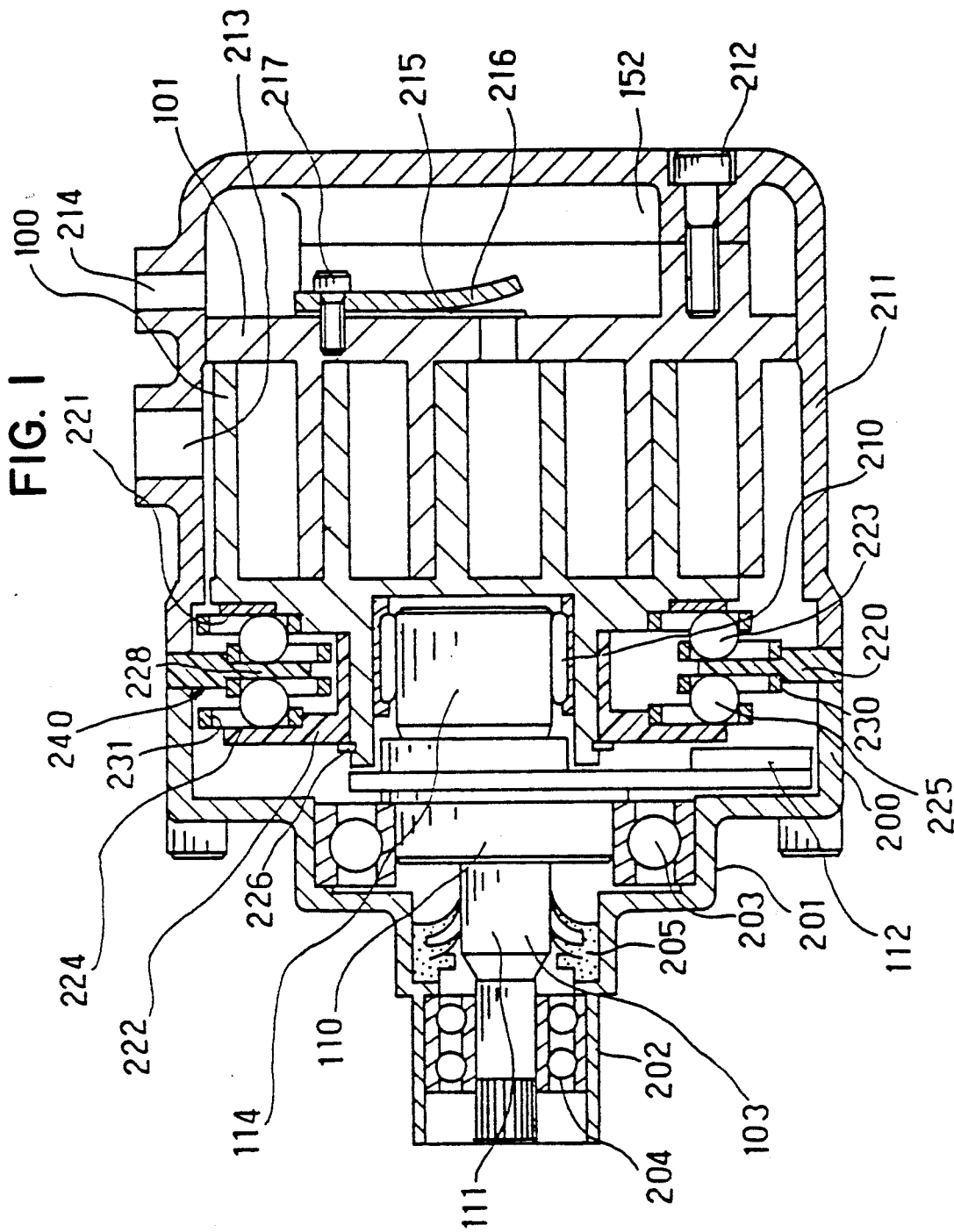
FIG. I

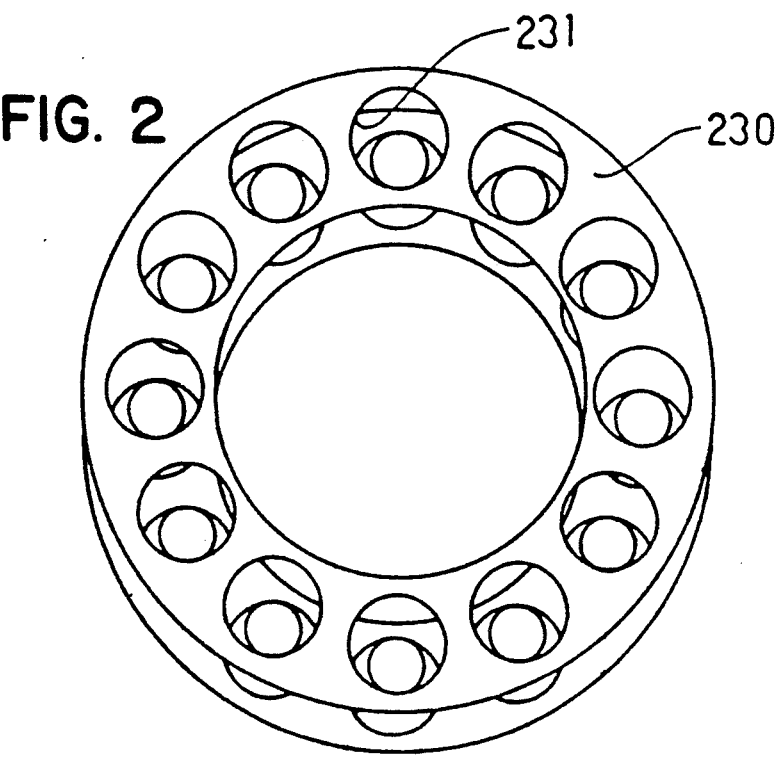
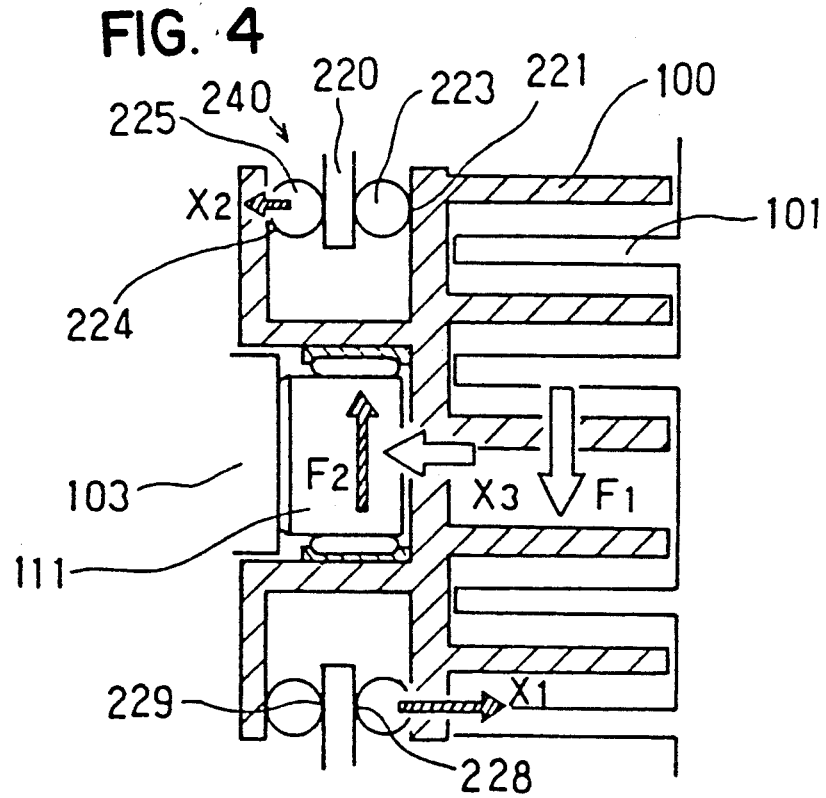

SCROLL TYPE COMPRESSOR WITH AXIALLY SUPPORTED MOVABLE SCROLL

This application is a divisional application of U.S. application Ser. No. 07/474,562, filed Jan. 31, 1990, which is abandoned.

FIELD OF THE INVENTION

The present invention relates to a scroll type compressor which is used as a refrigerant compressor, for example, for an automotive air conditioner.

BACKGROUND OF THE INVENTION

There are two ways to obtain large discharge volumes in conventional scroll type compressors: enlarge the diameter of the movable and fixed scrolls or increase their axial lengths. In the conventional compressor as shown in FIG. 9, for reasons described below the axial length of both movable scroll 100 and fixed scroll 101 can not be extended to obtain larger discharge volumes. Hence, the diameters of both scrolls 100, 101 must be extended in order to get enough discharge volume, causing the outer diameter of the compressor to become larger. That generally causes inconvenience in putting the scroll compressor in an engine room of a car when the scroll type compressor is used as a refrigerant compressor for an automotive air conditioner. So generally an enlarged compressor is not the solution, nor is increasing the axial length of the scrolls for reasons discussed below.

As shown in FIG. 9, the movable scroll 100 orbits and compresses the refrigerant in a working chamber 102, so that a reactive force F1 results on the movable scroll 100 due to differential pressures in the different parts of the chamber between the scrolls 100 and 101. In other words, a shaft 103 rotates the movable scroll 100 by a driving force F2 against the reactive force F1. Since the working directions of forces F1 and F2 are opposite, the bending moment for movable scroll 100 increases in the clockwise direction. That moment of rotation is cancelled by the moment of rotation which is caused from the thrust reactive forces X1, X2 acting on the ball bearing type support members 104, 105. The sum of the reactive forces X1, X2 is equal to a pressing force F3 by which the refrigerant in the working chamber 102 presses the movable scroll 100. The pressing force F3 is determined according to the volume of the working chamber 102 and has an almost constant value.

However, when the axial length of the scrolls 100 and 101 is increased as shown in FIG. 10, the bending moment from forces F1, F2 increases, causing a clockwise rotation or tilt of scroll 100. This in turn increases the reactive force X1 and eliminates the reactive force X2 of FIG. 9. The pressing force which forces the movable scroll 100 into the support member 105 does not occur. Instead, the outer end of the movable scroll 100 contacts the fixed scroll 101 and a new opposite direction reactive force X2 arises due to friction at the point where the movable scroll 100 contacts the fixed scroll 101. In other words, the support member 105 moves apart from a supporting plate 106.

When the movable scroll 100 tilts into contact with the fixed scroll 101, the friction or contact pressure of the movable scroll 100 and the fixed scroll 101 becomes larger. Also, the driving force to orbit the movable scroll 100 becomes larger than an appropriate value, and the durability of the movable scroll 100 and the fixed scroll 101 becomes less. Furthermore, since the movable scroll 100 inclines or tilts due to the clockwise bending moment, a leak of refrigerant from between the movable scroll 100 and the fixed scroll 101 might occur.

Because of the reasons described above, the movable scroll 100 and the fixed scroll 101 should not be designed in such a manner that the moment comprising the reactive force F1 and the driving force F2 becomes excessively large. Consequently, in the past it has been necessary to keep the widths of the movable scroll 100 and the fixed scroll 101 relatively small, preventing the capability of handling the presently required larger volumes of fluid.

SUMMARY OF THE INVENTION

An object of the present invention is to prevent tilting of the movable scroll and, especially its outer end, from contacting the fixed scroll even if the axial widths of the movable scroll and the fixed scroll become large.

In order to achieve the object, the scroll type compressor of the present invention has a thrust support member which engages with the movable scroll and prevents the movable scroll from not only moving apart from the fixed scroll but also moving nearer the fixed scroll. Because of this structure, the movable scroll keeps its axial position properly constant even if the reactive force and the driving force being applied to the movable scroll vary. Therefore, in the scroll type compressor of the present invention, the movable scroll is prevented from being in contact with the fixed scroll by the high pressing pressure. The reactive force being applied to the movable scroll and the bending moment comprising the reactive force and the driving force are determined without restriction. The axial width of the movable scroll and the fixed scroll are designed unrestrictedly and the freedom of design increases. When the axial widths of the movable scroll and the fixed scroll are large, the radial length of both scrolls are decreased, so that the outer diameter of the compressor becomes smaller.

Furthermore, since the axial position of the movable scroll is kept at the proper position by the thrust support member, it is possible that the fixed scroll is movable in its axial direction. When the fixed scroll is movable on its axial direction, the discharge volume of the compressor is capable of being variable and the motive power of the compressor is decreased.

BRIEF DESCRIPTION OF THE DRAWINGS

FIG. 1 is a sectional view showing a preferred embodiment of the compressor of the present invention;

FIG. 2 is a schematic view of the anti-rotating plate shown in FIG. 1;

FIG. 4 is a partial sectional view of the compressor showing the reacting force and the driving force;

DETAILED DESCRIPTION OF THE PREFERRED EMBODIMENT

Figure 3A:
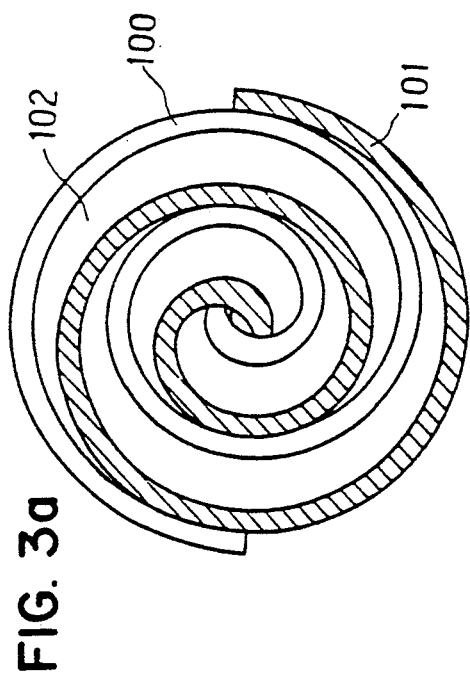
FIGS. 3(a) through FIG. 3(d) are diagrammatic views of the scrolls showing the working chamber on operation of the compressor.
Figure 3B:
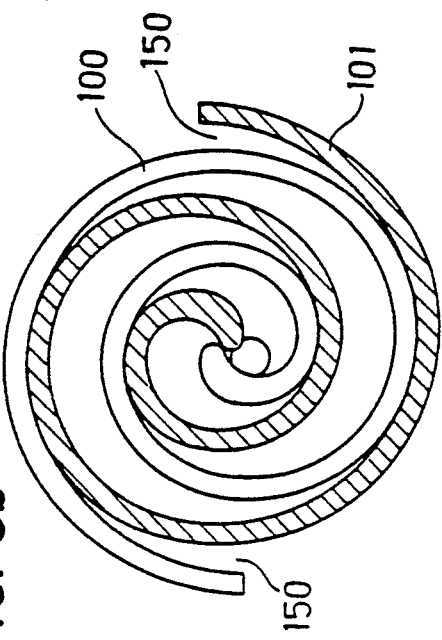
Figure 3D:
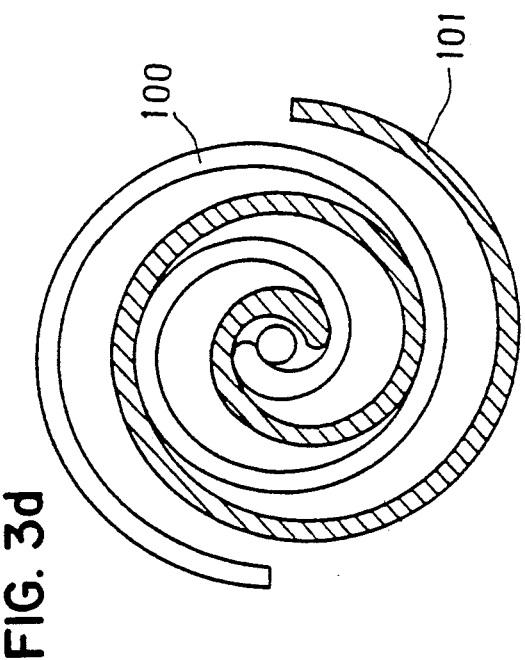
Figure 3C:
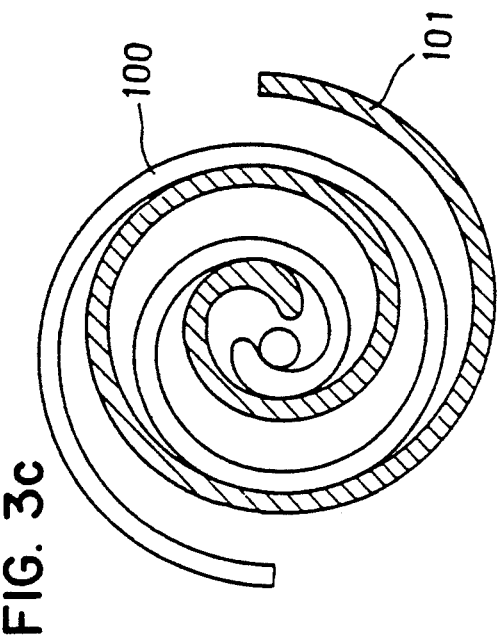

As shown in FIG. 1, a front housing 200 made of aluminum alloy has cylindrical portions 201, 202 on which ball bearings 203, 204 are supported. A small diameter portion 110 of a shaft 103 is supported on the front housing 200 via the ball bearing 204 and a large diameter portion of the shaft is supported on the front housing 200 via the ball bearing 203. The shaft 103 has a medium diameter portion 111 around which a shaft seal member 205 is disposed and the shaft seal member 205 prevents refrigerant and lubricant oil in the compressor from leaking out along the shaft 103. The shaft 103 has a crank portion 114 which is eccentric a certain amount relative to the shaft 103. A balance-weight 112 is fixed on shaft 103 in order to compensate for the eccentricity of the movable scroll 100.

The movable scroll 100 is supported on the crank portion 114 via a needle bearing 210 and orbits in a rear housing 211 upon receiving a driving force from the crank portion 114. A fixed scroll 101 is secured to the rear housing 211 by bolts 212. A suction port 213 and a discharge port 214 are disposed on the rear housing 211. The suction port 213 and the discharge port 214 are isolated from one another by the fixed scroll 101. In FIG. 1, the space to the left of the fixed scroll 101 is under suction pressure and the space to the right of the fixed scroll 101 is under discharge pressure. A discharge valve 215 and a valve cover 216 are fixed on the fixed scroll 101 by a bolt 217.

A thrust supporting plate 220 is disposed between the front housing 200 and the rear housing 211. A supporting plate 221 forming a first support surface 221A is disposed on the surface of the movable scroll 100 confronting the supporting plate 220. The supporting plate 221 and the supporting plate 220 are made of bearing metal. A supporting member 222 is fixed on the movable scroll 100 by a clip 226. Balls 223 are disposed between the first supporting surface 221 and the fixed supporting surface 228 of the supporting plate 220. Balls 225 are disposed between a second supporting surface 224 of the supporting member 222 and the fixed supporting surface 228. In the supporting arrangement 240, the balls 223 and 225 which act as ball bearings are tightly pressed between the center plate 220 and the respective support surfaces 221A and 224. Therefore, the axial displacement of the movable scroll 100 is restricted by the supporting arrangement 240 which includes the first supporting surface 221A, the balls 223, supporting plate 220 and the balls 225.

The balls 223 and 225 are held in an anti-rotation plate 230 shown in FIG. 2. The anti-rotation plate 230 is comprised of a pair of plates in order to hold the balls 223, 225 between them and the holding holes 231 having a same radius as the radius of the orbit of movable scroll 100.

The operation of the compressor is now described. The driving power of an engine of an automobile is transmitted to the shaft 103 via an electromagnetic clutch (not shown) which is disposed on the cylindrical portion 202, so that the shaft 103 rotates on its axis in the front housing 200. Since the crank portion 114 is eccentric to the shaft 103 a certain amount, the movable scroll 100 bodily moves in an orbit in the rear housing 211 without rotating. Rotation of the movable scroll 100 is prohibited by the anti-rotation plate 230 and the balls 223 and 225.

FIGS. 3(a) through FIG. 3(d) show the orbiting of the movable scroll 100. According to the movement of the movable scroll 100, the working chamber formed between the movable scroll 100 and the fixed scroll 101 increases and decreases its volume. Since the space outside of the movable scroll 101 is at suction pressure, the refrigerant is introduced into the working chamber 102 through the space 150 formed during movement of the movable scroll 100 relative to the fixed scroll 101. The refrigerant is compressed according to the decreasing of the volume of the working chamber 102, and when the pressure of the compressed refrigerant exceeds a predetermined value, the compressed refrigerant opens the discharge valve 215 and is discharged into the discharge chamber 152 through the discharge port 151. In the compressor of this embodiment, one operation of compression is accomplished by about 2.2 orbital revolutions of the movable scroll 100. The pressurized refrigerant discharged into the discharge chamber 152 is introduced to the condenser of the refrigerant cycle (not shown) through a discharge connecting hole 214.

The pressure of the refrigerant in the working chamber 102 is applied to the movable scroll 100 as the reactive force F1. The driving force corresponding to the reactive force F2 which corresponds to the reactive force F1 occurs on the crank portion 11 as shown in FIG. 4. Since the axial widths of the movable scroll 100 and the fixed scroll 101 are relatively large, about 35 mm, the bending moment comprising the reactive force F1 and the driving force F2 is quite large causing a clockwise bending moment. This bending moment causes force X1 between the fixed supporting surface 228 of the supporting plate 220 and the first supporting surface 221 of the movable scroll 100. It also causes force X2 between the fixed supporting surface 228 of the supporting plate 220 and the second supporting surface 224 of the movable scroll 100. The sum of the force X1 and the force X2 is equal to the force X3 applied to the movable scroll 100 from the working chamber 102.

Figure 5:
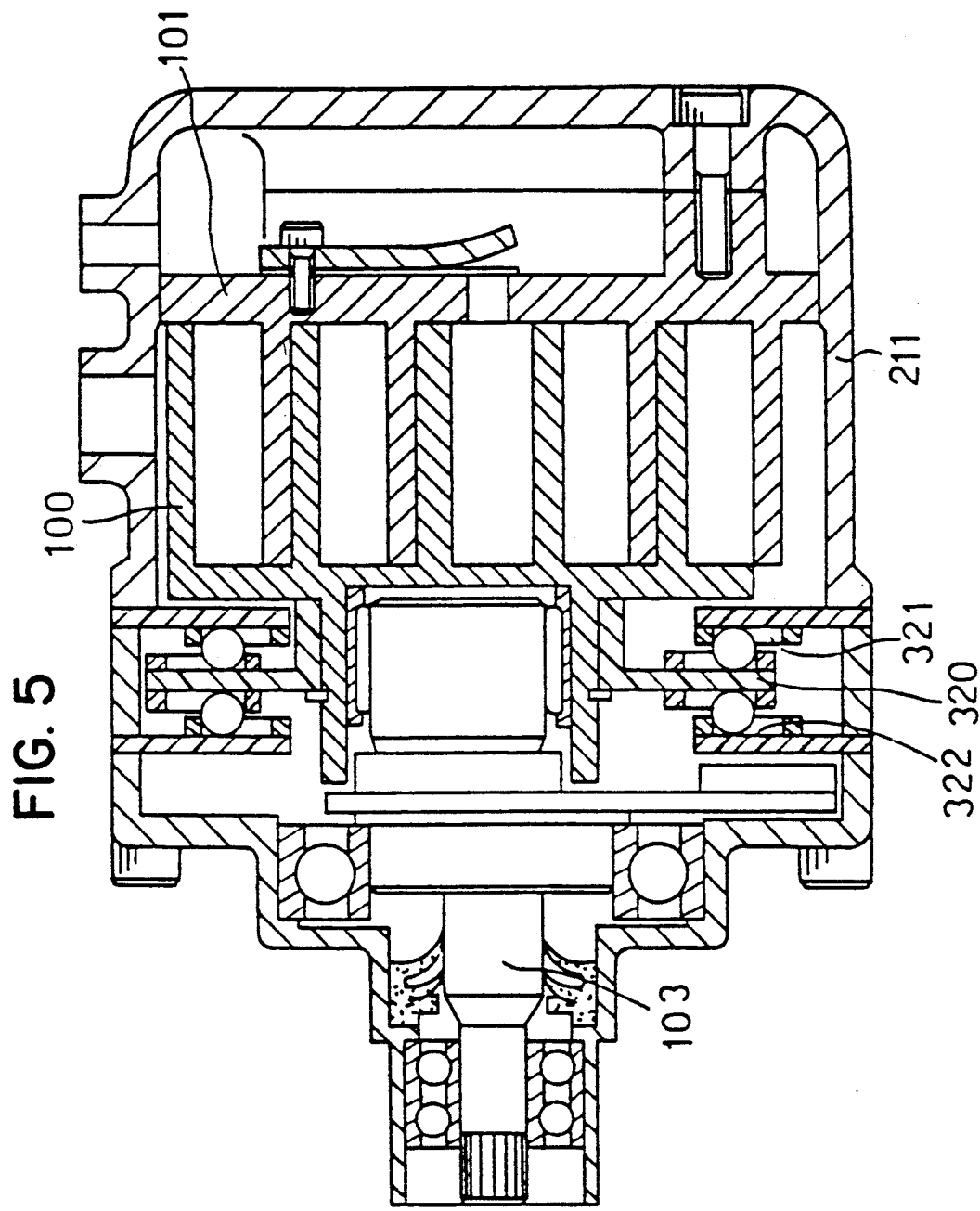
FIG. 5 is a sectional view of a second embodiment of the present invention.

In this embodiment, the supporting member 240 includes the first supporting surface 221, the balls 223, supporting plate 220, the balls 225 and the second supporting surface 224. The axial deplacement of the movable scroll 100 is restricted properly by the supporting member 240. That is, the supporting member 240 prevents the movable scroll 100 from not only moving apart from the fixed scroll 101 but also from contacting the fixed scroll 101. Therefore, even if the bending moment comprising the reactive force F1 and the driving force F2 becomes larger, the movable scroll 100 is prevented from being inclined or tilted to the right at top in FIG. 4, so that the axial widths of the movable scroll 100 and the fixed scroll 101 can be 35 mm for example, which is relatively large. Consequently, the radial lengths of the movable scroll 100 and the fixed scroll 101 can become shorter and the outer diameters of the front housing 200 can be reduced as can be the rear housing 211 to about 105 mm In the embodiment described above, the first supporting surface 221A and the second supporting surface 224 are formed on the movable scroll 100 and the supporting plate 220 is between them. However, as shown in FIG. 5., the supporting plate 320 can be fixed on the movable scroll 100, and the first supporting surface 321 and the second supporting surface 322 can be formed on the housing.

Figure 6:
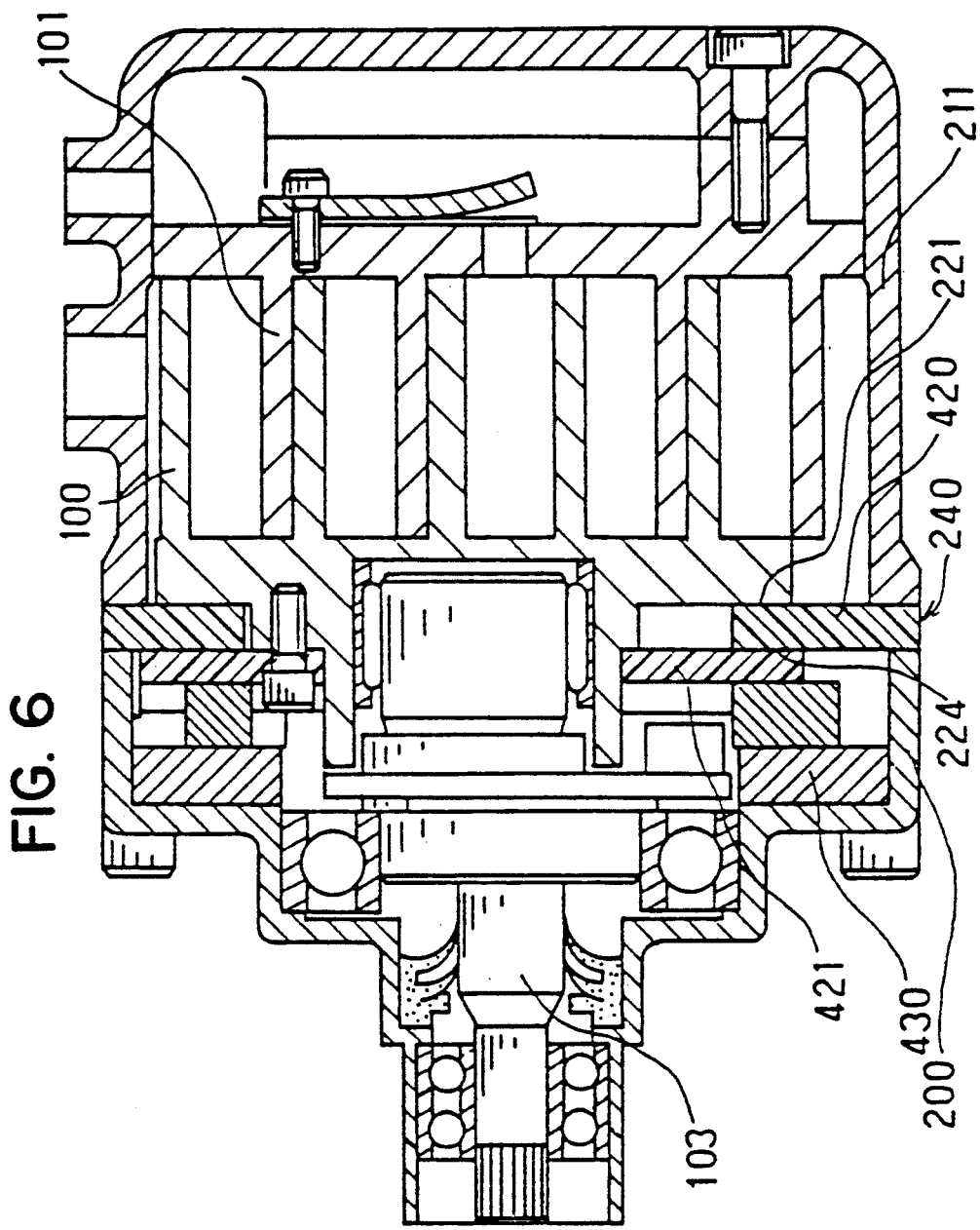
FIG. 6 is a sectional view of a third embodiment of the present invention.

Furthermore, in the embodiment described above, the supporting member 240 includes the anti-rotation plate 230 and achieves the functions of supporting and anti-rotation at the same time. However, the functions of supporting and anti-rotation can be achieved separately as shown in FIG. 6. In this embodiment, a supporting plate 420 is between the front housing 200 and the rear housing 211. The first supporting surface 221 on which the supporting plate 420 slides is formed on the movable scroll 100. A supporting member 421 having the second supporting surface 224 on which the supporting plate 420 slides is fixed on the movable scroll 100. Besides the supporting member 240, a movable joint 430 is disposed in the front housing 200 and the movable scroll is prevented from rotation about its own axis by the movable joint 430.

Figure 7:
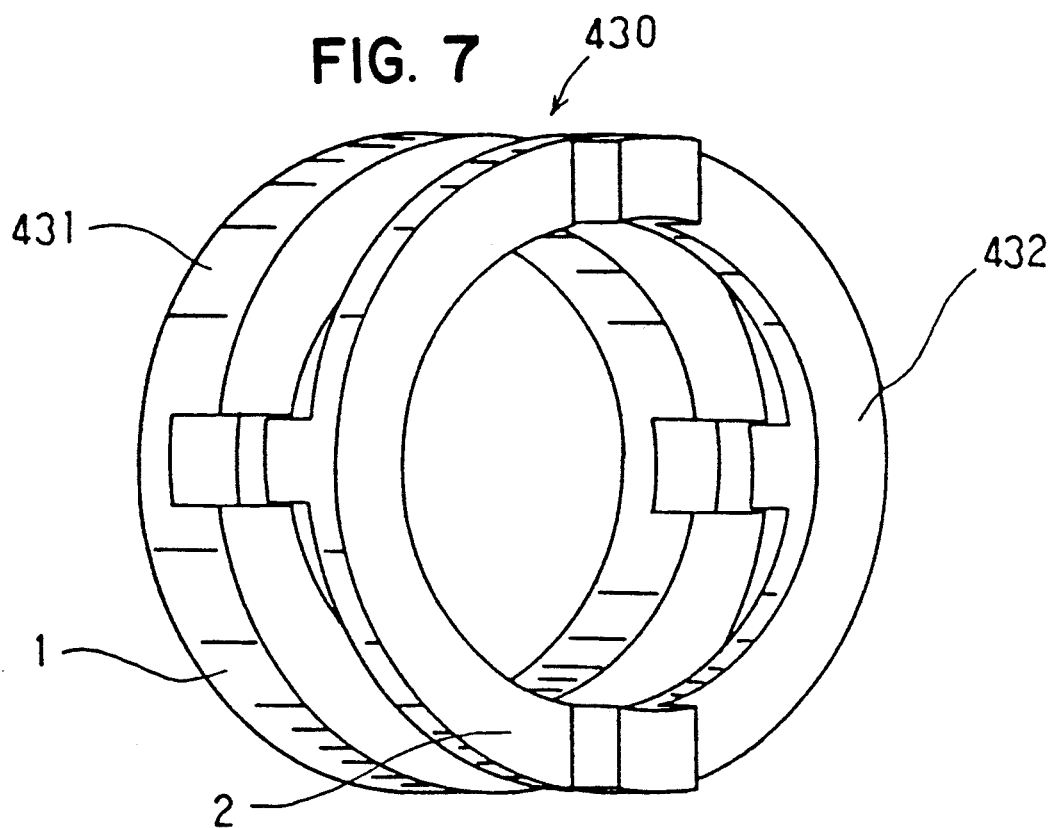
FIG. 7 is a diagrammatic view of the movable joint of the compressor shown in FIG. 6.

The movable joint 430 is shown schematically in FIG. 7. The movable joint 430 has a pair of fixed plates. Plate 431 is fixed on the front housing 200 and another plate (not shown in FIG. 7) is fixed on the movable scroll 100 as the supporting plate 421. An intermediate plate 432 is disposed between the fixed plate 431 and the supporting plate 421. The movable joint 430 comprising of fixed plate 431, intermediate plate 432 and supporting plate 421 prevents the movable scroll 100 from rotating.

Figure 8:
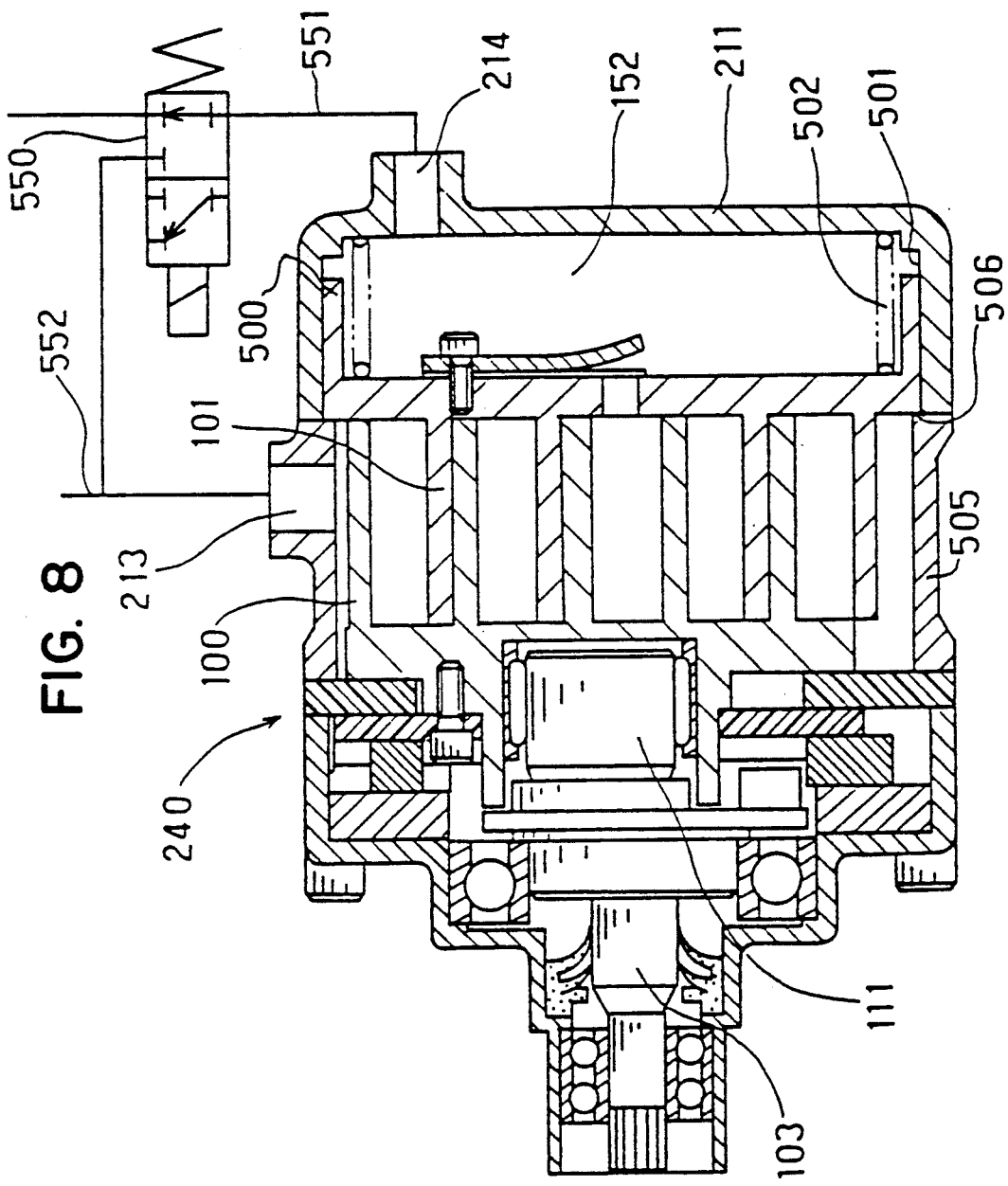
FIG. 8 is a sectional view of a fourth embodiment of the present invention.
Figure 9:
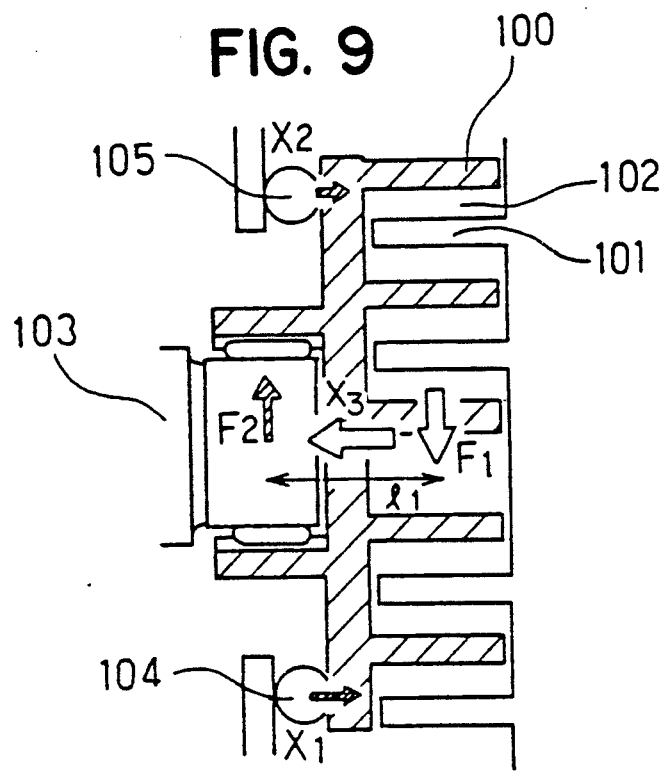
FIGS. 9 and FIG. 10 are partial sectional views showing the reacting force and the driving force of a conventional compressor.
Figure 10:
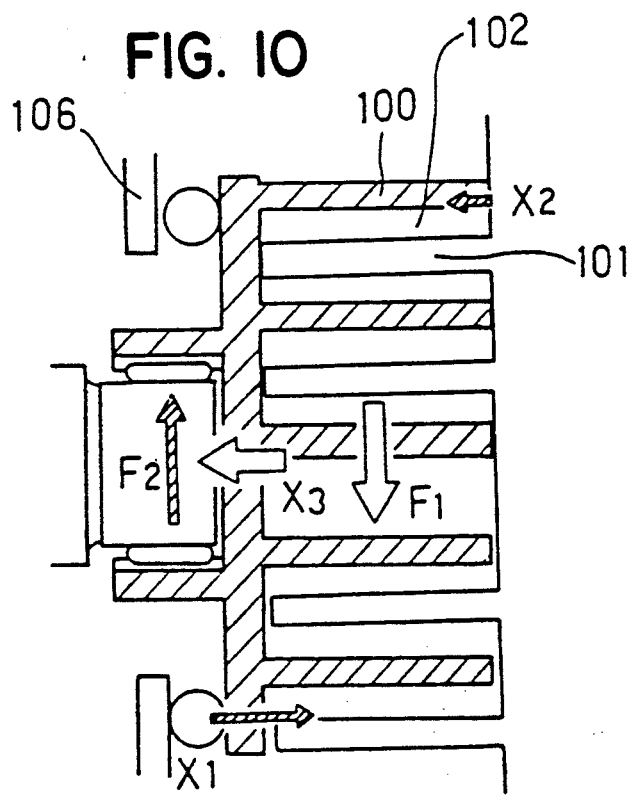

FIG. 8 shows another embodiment of the present invention. Since the axial displacement of the movable scroll 100 is restricted by the supporting member 240, it is needless for the fixed scroll 101 to hold the movable scroll 100. Therefore, the fixed scroll 101 is able to move axially. The fixed scroll 101 has a cylindrical supporting portion 50 which is in slidable contact with the inner surface 501 of the rear housing 211. The discharge chamber 152 is formed in the rear housing 211 and a spring 502 is disposed between the rear housing 211 and the fixed scroll 101. The spring 502 biases the fixed scroll 101 toward the movable scroll 100.

A stopper wall 506 is formed between a center housing 505 and the rear housing 211, and the fixed scroll 101 is held by the stopper wall 506. The fixed scroll 101 is biased to the stopper wall 506 by the force comprising the force of the spring 502 and the differential pressure in front of and behind the fixed scroll 101. In other words, the high pressure in the discharge chamber 152 is applied to the right side of the fixed scroll 101 and the pressure in the working chamber 102 is applied to the left side of the fixed scroll 101 in FIG. 8. The value of the pressure in the working chamber 102 varies from the suction pressure to the discharge pressure. The integral value of that varying pressure is less than the value of the discharge pressure. The differential pressure acts in the direction of biasing the fixed scroll 101 into the stopper wall 506. In a usual operation, the fixed scroll 101 always keeps its axial position against wall 506.

The displacement of the fixed scroll 101 is controlled by a control valve 550. The control valve 550 is switched for normal operation into a position to open the discharge path 551 as shown in FIG. 8. However, to reduce the load during start up, for example, valve 550 may be switched to its other position to close the discharge path 551 and to connect the discharge path 551 with the suction path 552 as shown in FIG. 8.

When the control valve 550 is switched into the position to connect the discharge path 551 with the suction path 552, the pressure in the discharge chamber 152 is relieved into the suction path 552 and the pressure in the discharge chamber 152 becomes the suction pressure. In this situation, the force biasing the fixed scroll 101 to the right in FIG. 8 increases in value. The value of the pressure in the working chamber 102 becomes larger than the value of the pressure in the discharge chamber 152, and the fixed scroll 101 is moved rightwardly in FIG. 8. When the fixed scroll 101 is displaced, the clearance between the fixed scroll 101 and the movable scroll 101 becomes larger and the working chamber 102 can not keep its proper shape, and the refrigerant can not be compressed in the working chamber 102.

Therefore, when the discharging pressure becomes extremely high and the temperature of the discharged refrigerant increases extremely, the operation of the compressor can be stopped by switching the control valve 550. When the refrigerating power is controlled by switching the control valve 550 instead of switching an electromagnetic clutch, noise due to conventional switching of the electromagnetic clutch is eliminated and the life of the electromagnetic clutch increases.

In the embodiment shown in FIG. 8., the displacement of the fixed scroll 101 is achieved by switching the control valve 550 and varying the value of the pressure in the discharge chamber 152. However, the fixed scroll 101 could be displaced directly and mechanically and any other biasing means could be used.

Figure 11:
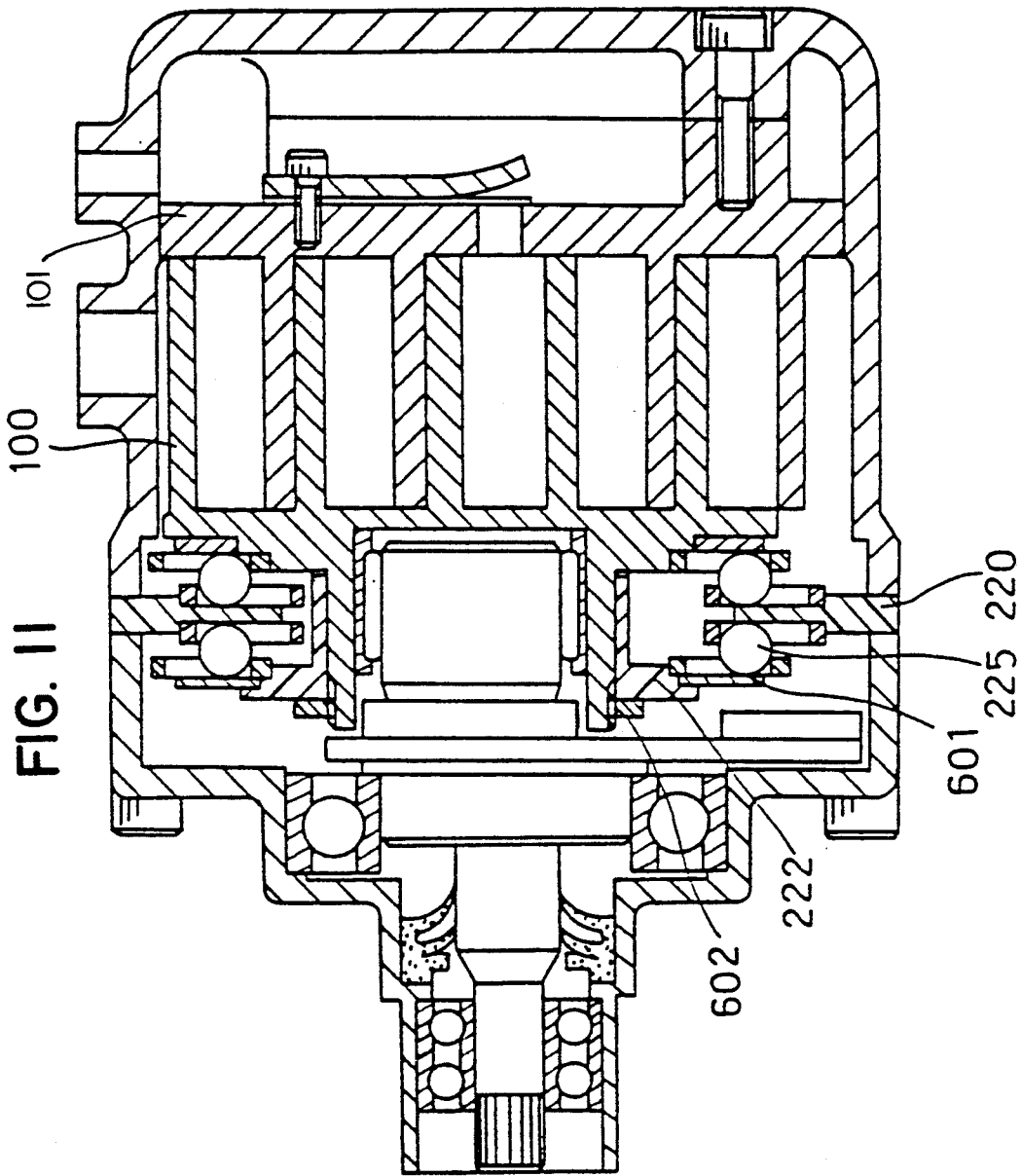
FIG. 11 is a sectional view of a fifth embodiment of the present invention.

FIG. 11 shows another embodiment of the present invention. The compressor of the embodiment has an adjusting mechanism of the force applied to the movable scroll 100. A plate 601 supporting the balls 225 is supported by the supporting member 222 which is movable axially on the cylindrical portion of the movable scroll 100. The axial position of the supporting member 222 is adjusted by a nut 602 screwed on a male screw formed on the cylindrical portion of the movable scroll 100.

The forces applied to balls 225 is adjusted and the movable scroll 100 is supported by proper forces by adjusting the position of the nut 602. The plate 601 changes its form elastically according to the advance of the nut 602, and the movable scroll 100 is supported stably by the supporting plate 220 by the forces due to the deformation of the plate 601.

What is claimed is:
1. A scroll type compressor comprising:
   a shaft having an axis and being rotatable thereon upon receiving a rotative force and having a crank portion which is eccentric to the axis of the shaft;
   a movable scroll supported rotatively by the crank for orbital movement around the axis of the shaft;
   a fixed scroll for forming a working chamber with the movable scroll, which is engaged with the movable scroll in a manner that the fixed scroll is movable away from the movable scroll;
   biasing means for moving the fixed scroll toward the movable scroll;
   controlling means for controlling a biasing force of the biasing means; and
   supporting means, engaged with the movable scroll, for holding the movable scroll at a relative position with respect to the fixed scroll, to keep it from moving apart from, and also from moving excessively towards the fixed scroll.

2. A scroll type compressor according to claim 1, wherein the supporting means includes:
   a fixed supporting member having a fixed supporting surface; and
   a movable supporting member having a movable supporting surface which is movable with the movable scroll and is engaged with the the fixed supporting surface.

3. A scroll type compressor according to claim 1, wherein the biasing means includes a spring disposed in a discharge chamber which is formed outside of the fixed scroll.

4. A scroll type compressor according to claim 3, wherein the controlling means includes pressure control means for controlling pressure within the discharge chamber.

* * * * *